Patented May 4, 1954

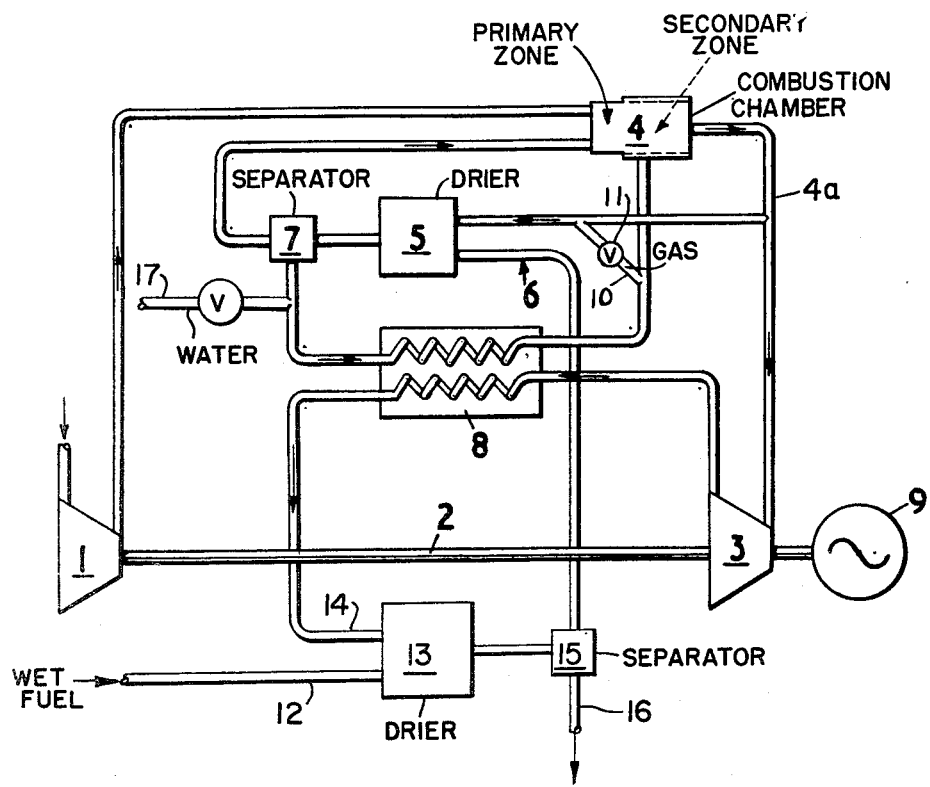

2,677,234

UNITED STATES PATENT OFFICE 2,677,234

GAS TURBINE POWER PLANT UTILIZING SOLID WATER-BEARING FUEL

Campbell Herbert Secord, London, England, assignor to Power Jets (Research and Development) Limited, London, England, a British company Application September 10, 1951, Serial No. 245,946

Claims priority, application Great Britain September 14, 1950

5 Claims. (Cl. 60—39.02)

This invention relates to gas turbine power plants utilising solid water-bearing fuel, and is an improvement or modification of the constructions described in co-pending United States patent application Serial No. 103,993, filed July 11, 1949, in the name of the present inventor.

By the term "water-bearing fuel" herein is meant a fuel containing or being otherwise combined with a substantial quantity of water which might amount to as much as ten times its own weight. Such a fuel may for example be bagasse, sewage sludge, coal slurry, sulphite pulp mill waste, town refuse or peat.

As more fully explained in said co-pending application, this type of gas turbine combines the idea of injecting water into the working fluid system with the use of a fuel having a water content such as to render its use normally uneconomic. The use of water injection has the result that, for a designed temperature at the turbine, the quantity of cooling air above that required for complete combustion may be reduced and the size of the plant correspondingly decreased. Such water injection normally requires a large external supply of water but this is obviated in the present case by utilising the water content of a water-bearing fuel which might otherwise be useless. This introduction of water will be particularly advantageous if the quantity of water supplied to the working fluid system reaches a maximum amount consistent with a designed maximum temperature at the turbine inlet and a substantially stoichiometric air-fuel ratio in the combustion chamber. Water injection under these circumstances will be referred to as "maximum water injection."

In gas turbines of the type referred to a considerable quantity of the available energy is lost in the exhaust gases. This invention seeks to provide a gas turbine wherein at least part of this energy is recovered with a corresponding gain in efficiency.

Accordingly the invention provides a gas turbine power plant for utilising solid water-bearing fuel comprising a fuel drier to which said fuel is supplied and in which at least part of the water content thereof is evaporated, a combustion chamber receiving the solid content of the fuel from the drier, a heat exchanger, the cold side of which receives at least part of the evaporated water content from the drier, and a turbine through which both the combustion gases and the whole of the water content pass, the exhaust gases from the turbine being discharged through the hot side of the heat exchanger.

Preferably drying of the fuel is effected by recirculating part of the combustion gases from the combustion chamber to the fuel drier, as described in said co-pending application.

A specific embodiment of the invention will now be described by way of example with reference to the accompanying drawing which is a diagrammatic layout of a gas turbine power plant for driving an alternator.

The plant comprises a compressor 1 connected by a shaft 2 to a turbine 3 which drives it. The compressor 2 discharges through ducting into a combustion chamber 4 and the combustion gases are led through further ducting to the turbine 3. Part of the combustion gases from the combustion chamber are divided off at 4a and recirculated into a fuel drier 5, to which solid water-bearing fuel is supplied through inlet 6. The hot combustion gases mix with the fuel and evaporate part of the water content thereof. The mixture of solid fuel, recirculated gases and steam is then passed to separator 7 where the solid fuel is separated out and led directly to the combustion chamber 4 where it is burnt in the air supplied by compressor 1. The gaseous constituents from the separator are led through one side (hereinafter referred to as the cold side) of a heat exchanger 8 where they are heated by the exhaust gases from the turbine 3, and then pass into the combustion chamber 4 where they serve first to cool the walls thereof in known manner (as shown purely diagrammatically in the drawing), and then mix with the combustion gases and reduce their temperature to the designed maximum value at the turbine inlet.

That part of the combustion gases not recirculated to the drier 5 passes to the turbine 3, which is connected to drive alternator 9, and are then discharged through the hot side of heat exchanger 8 where they serve to heat the evaporated water content of the fuel and the recirculated gases as previously described.

A by-pass 10 is also provided, connecting the exit of the cold side of the heat exchanger 8 to the fuel drier 5. This by-pass includes a valve 11.

The plant is so designed that the quantity of recirculated gases is such as to give a temperature corresponding to the dewpoint at the entry to the cold side of the heat exchanger 8, that is, sufficient water is evaporated to produce saturated gases at that point. This will give the greatest possible temperature difference between the hot and cold sides of the heat exchanger.

At the same time it is desirable to provide the largest practicable mass flow in the cold side of the heat exchanger 8 so as to obtain the greatest advantage from the heat of the exhaust gases. However, when using fuel of comparatively low water content, only a small quantity of recirculated gases will be required and the flow may be quite small and the greater part of the exhaust gas heat will go to waste with corresponding loss of efficiency. To obviate this some of the gases from the cold side of the heat exchanger can be led back into the drier through by-pass 10 by opening valve 11. The temperature of the gases entering the drier is thereby reduced and thus the mass flow for a given degree of evaporation is increased. This expedient has a slight disadvantage in that the steam concentration in the drier is increased and hence the dewpoint is raised, so that there is a slightly smaller temperature difference in the heat exchanger.

The valve 11 in the by-pass 10 makes it possible to vary this return flow to the drier, so that the plant can be adapted to cover a range from stoichiometric air-fuel ratio in the primary combustion zone of the combustion chamber 4 to an excess air supply of several hundred per cent, as will be required with low moisture content fuel. The plant, however, is thought to be most suitable for fuels of high moisture content, corresponding to maximum water injection.

If desired, the incoming fuel to the drier can be pre-heated and partially dried by means of the exhaust gases after they leave the heat exchanger 8, for example, in the manner described in said co-pending application. The raw fuel is led through inlet 12 into a drier 13 which has a further inlet 14 connected to receive the exhaust gases from the hot side of the heat exchanger 8, and an outlet connected to a separator 15. The hot gases evaporate part of the water content of the fuel in the drier 13, and the resultant steam, the hot gases and the solid fuel are all led to the separator 15. Here the gaseous and solid constituents are separated, the partly dried and preheated solid fuel with its remaining water content being supplied to inlet 6 of the drier 5, and the steam and exhaust gases being discharged at 16. This would make it possible to use raw fuel having a greater moisture content than would otherwise be the case.

Ideally the various components of the plant will be designed for a particular set of conditions of air flow, fuel supply and moisture content of the fuel. In practice it may be necessary to introduce further controls, for instance, additional water might be introduced into the system through inlet 17 between outlet of separator 7 and the inlet to the cold side of heat exchanger 8 to reduce the temperature of gases passing through the turbine to the designed value and at the same time to supplement the mass flow of gases through the cold side of the heat exchanger 8 if the moisture present temporarily becomes insufficient.

In the ideal case there will be no moisture in the primary combustion zone of the combustion chamber but in practice up to about 30 per cent moisture content will be permissible without affecting the efficiency to any substantial extent. Thus when using a fuel of fairly low moisture content, the gases from the cold side of the heat exchanger may be led into the primary combustion zone of the combustion chamber together with the fuel.

I claim:

1. A gas turbine power plant for utilizing solid water-bearing fuel comprising a fuel drier for evaporating at least part of the water content of said fuel, having an inlet for said fuel and an outlet; a separator for separating at least part of said evaporated water content from the solid content of the fuel, having an inlet connected to the drier outlet, a first outlet for said part of the evaporated water content, and a second outlet for said solid content; a combustion chamber having an inlet connected to said second outlet of the separator and an outlet for combustion gases; a turbine having an inlet connected to the combustion chamber outlet and an outlet for exhaust gases; a heat exchanger of which the hot side has an inlet connected to the turbine outlet, and an exhaust outlet, and the cold side has an inlet connected to the first outlet of the separator, and an outlet; and a connection between the outlet of the cold side of the heat exchanger and the turbine inlet.

2. A gas turbine power plant for utilizing solid water-bearing fuel comprising a fuel drier for evaporating at least part of the water content of said fuel, having a first inlet for said fuel, a second inlet and an outlet; a separator for separating at least part of said evaporated water content from the solid content of the fuel, having an inlet connected to the drier outlet, a first outlet for said part of the evaporated water content, and a second outlet for said solid content; a combustion chamber having an inlet connected to said second outlet of the separator and an outlet for combustion gases; a connection between the combustion chamber outlet and the second inlet of the drier to afford a path for part of the combustion gases to the drier to evaporate said part of the water content; a turbine having an inlet connected to the combustion chamber outlet and an outlet for exhaust gases; a heat exchanger of which the hot side has an inlet connected to the turbine outlet, and an exhaust outlet, and the cold side has an inlet connected to the first outlet of the separator, and an outlet; and a connection between the outlet of the cold side of the heat exchanger and the turbine inlet.

3. A gas turbine power plant according to claim 2 further comprising a connection affording a steam and gas flow path between the outlet of the cold side of the heat exchanger and the drier, and means for varying the flow through said path.

4. A gas turbine power plant for utilizing solid water-bearing fuel comprising a fuel drier for evaporating at least part of the water content of said fuel, having an inlet for said fuel and an outlet; a separator for separating at least part of said evaporated water from the solid content of the fuel, having an inlet connected to the drier outlet, a first outlet for said part of the evaporated water content, and a second outlet for said solid content; a combustion chamber including a primary combustion zone and secondary and mixing zones downstream thereof, and having a first inlet to said primary zone connected to said second outlet of the separator, a second inlet to a zone downstream of the primary zone, and an outlet for combustion gases; a turbine having an inlet connected to the combustion chamber outlet and an outlet for exhaust gases; and a heat exchanger of which the hot side has an inlet connected to the turbine outlet, and an exhaust outlet, and the cold side has an inlet connected to the first outlet of the separator, and an outlet connected to the second inlet of the combustion chamber.

5. A method of operating a gas turbine plant including a combustion chamber, a turbine connected to receive hot combustion gases therefrom, and a heat exchanger connected to receive exhaust gases from the turbine, comprising the steps of supplying to the plant a solid water-bearing fuel, leading into contact therewith part of the hot combustion gases from the combustion chamber and thereby evaporating at least part of the water content of the fuel, at least partly separating the solid and gaseous constituents, supplying the solid constituents to the combustion chamber and burning them therein in air, and supplying the gaseous constituents firstly to the heat exchanger to be heated therein by the exhaust gases and then to the turbine, wherein the quantity of combustion gases led into contact with the fuel is such that the temperature of said gaseous constituents entering the heat exchanger corresponds to the dewpoint thereof.

References Cited in the file of this patent

UNITED STATES PATENTS

| Number | Name | Date |
|---|---|---|
| 1,197,456 | Dinsmore | Sept. 5, 1916 |
| 1,809,819 | Caller | June 16, 1931 |
| 2,032,402 | Colby et al. | Mar. 3, 1936 |
| 2,066,418 | O'Mara | Jan. 5, 1937 |
| 2,148,447 | Dundas et al. | Feb. 28, 1939 |
| 2,171,535 | Berg et al. | Sept. 5, 1939 |

FOREIGN PATENTS

| Number | Country | Date |
|---|---|---|
| 18,329 | Great Britain | Aug. 24, 1904 |